United States Patent [19]
Mitchell et al.

[11] Patent Number: 5,598,741
[45] Date of Patent: Feb. 4, 1997

[54] CLAMPING MECHANISM FOR AN ADJUSTABLE STEERING COLUMN FOR A VEHICLE

[75] Inventors: Colin A. Mitchell, Northamptonshire; Gerald A. Speich, Warwickshire, both of England

[73] Assignee: The Torrington Company, Torrington, Conn.

[21] Appl. No.: 401,539

[22] Filed: Mar. 10, 1995

[51] Int. Cl.⁶ .................................................. B62D 1/18
[52] U.S. Cl. ................................................ 74/493; 74/531
[58] Field of Search ........................ 74/493, 531; 280/777

[56] References Cited

U.S. PATENT DOCUMENTS

| | | | |
|---|---|---|---|
| 4,244,237 | 1/1981 | Sprunger | 74/493 |
| 4,541,298 | 9/1985 | Strutt | 74/493 |
| 4,648,624 | 3/1987 | Mouhot et al. | 280/775 |
| 4,656,888 | 4/1987 | Schmitz | 74/493 |
| 5,131,286 | 7/1992 | Sturges et al. | 74/493 |
| 5,165,720 | 11/1992 | Hoblingre | 74/493 |
| 5,199,319 | 4/1993 | Fujiu | 74/493 |
| 5,338,064 | 8/1994 | Sadakata et al. | 74/493 |
| 5,392,667 | 2/1995 | Courvoisier | 74/493 |
| 5,423,572 | 6/1995 | Stuedemann et al. | 74/493 |

FOREIGN PATENT DOCUMENTS

| | | |
|---|---|---|
| 0167925 | 1/1986 | European Pat. Off. . |
| 0199106 | 10/1986 | European Pat. Off. . |
| 0222628 | 5/1987 | European Pat. Off. . |
| 0242928 | 10/1987 | European Pat. Off. . |
| 0443881A2 | 8/1991 | European Pat. Off. . |
| 0529769A1 | 3/1993 | European Pat. Off. . |
| 2491024 | 4/1982 | France . |
| 1287269 | 8/1972 | United Kingdom . |
| 2087808 | 3/1984 | United Kingdom . |

*Primary Examiner*—Khoi Q. Ta
*Assistant Examiner*—David Fenstermacher
*Attorney, Agent, or Firm*—Michael H. Minns

[57] ABSTRACT

A clamping mechanism for an adjustable steering column incorporates a pre-set but variable preload. An operating handle is fitted on a shaft to rotate between clamped and unclamped conditions. Part of the shaft is provided with opposed flats about which a shaft lock washer is non-rotatably fitted. The lock washer operates with a stop member to prevent rotation of the assembly and a nut is tightened on one end of the shaft to the required preload.

16 Claims, 3 Drawing Sheets

5,598,741

CLAMPING MECHANISM FOR AN ADJUSTABLE STEERING COLUMN FOR A VEHICLE

This invention relates generally to adjustable steering columns for a vehicle and more particularly to a clamping mechanism for an adjustable steering column.

In known clamping mechanisms, any required preload of the clamping system is effected manually upon manufacture. These and other clamping systems can also have somewhat complicated constructions to transmit the preload.

The foregoing illustrates limitations known to exist in present adjustable steering column mechanisms. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a steering column clamping mechanism for use with an adjustable steering column, the mechanism having an unclamped condition allowing movement of the steering column and having a clamped condition preventing movement of the steering column, the clamping mechanism comprising: a support bracket having a thickness and a slot therethrough; a steering column bracket slidable relative to the support bracket; at least one stop member being positioned in the support bracket slot; and an operating mechanism having a shaft extending therefrom, the shaft extending through the support bracket slot, the steering column bracket and the stop member, the operating mechanism being moveable from an unclamped condition to a clamped condition, when the operating mechanism is in the unclamped condition, the stop member slidably engages the support bracket slot, and when the operating mechanism is in the unclamped condition, portions of the support bracket are clamped between the operating mechanism and the steering column bracket.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

According to the present invention, there is provided a clamping mechanism for an adjustable steering column for a vehicle, in which a pre-set but variable preload is applied to the clamping mechanism. The preload can be applied automatically during assembly of the clamping mechanism.

Preferably, the clamping mechanism includes an actuating member acting through a non-rotatable shaft to clamping means, the shaft being threaded at one end and being tensioned against the clamping means for the steering column by means of a threaded member tightened to said pre-set preload on the shaft. The threaded member can be a nut.

The shaft can be held in non-rotatable fashion by means of a shaft lock member fitted about a non-circular portion of said shaft and locking against another part of the mechanism to prevent rotation of the shaft. The shaft lock member can be in two parts, namely a lock washer having at least one cut-away portion to receive a cooperating protrusion of a separate stop member.

The invention also extends to an adjustable steering column incorporating a clamping mechanism essentially as defined above.

Figure 1:
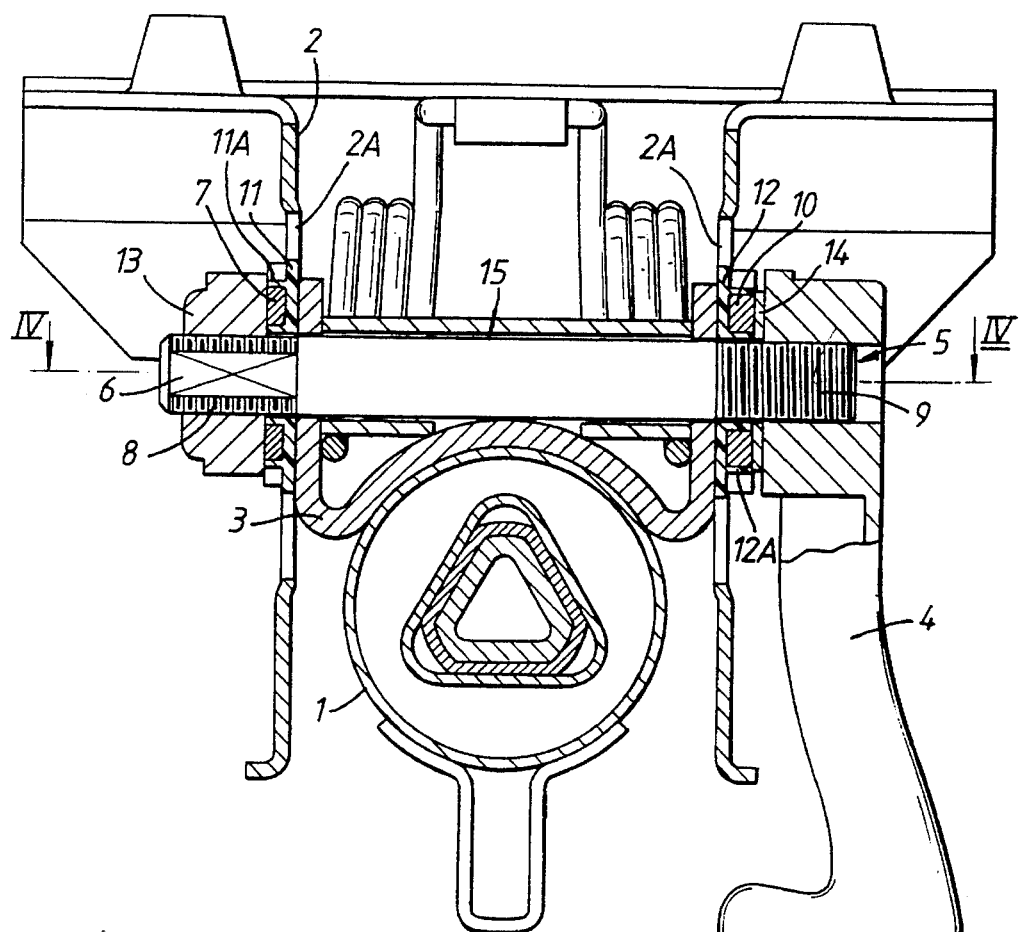
FIG. 1 is a diagrammatic vertical sectional view showing part of the clamping mechanism for an adjustable steering column of a vehicle.
Figure 2:
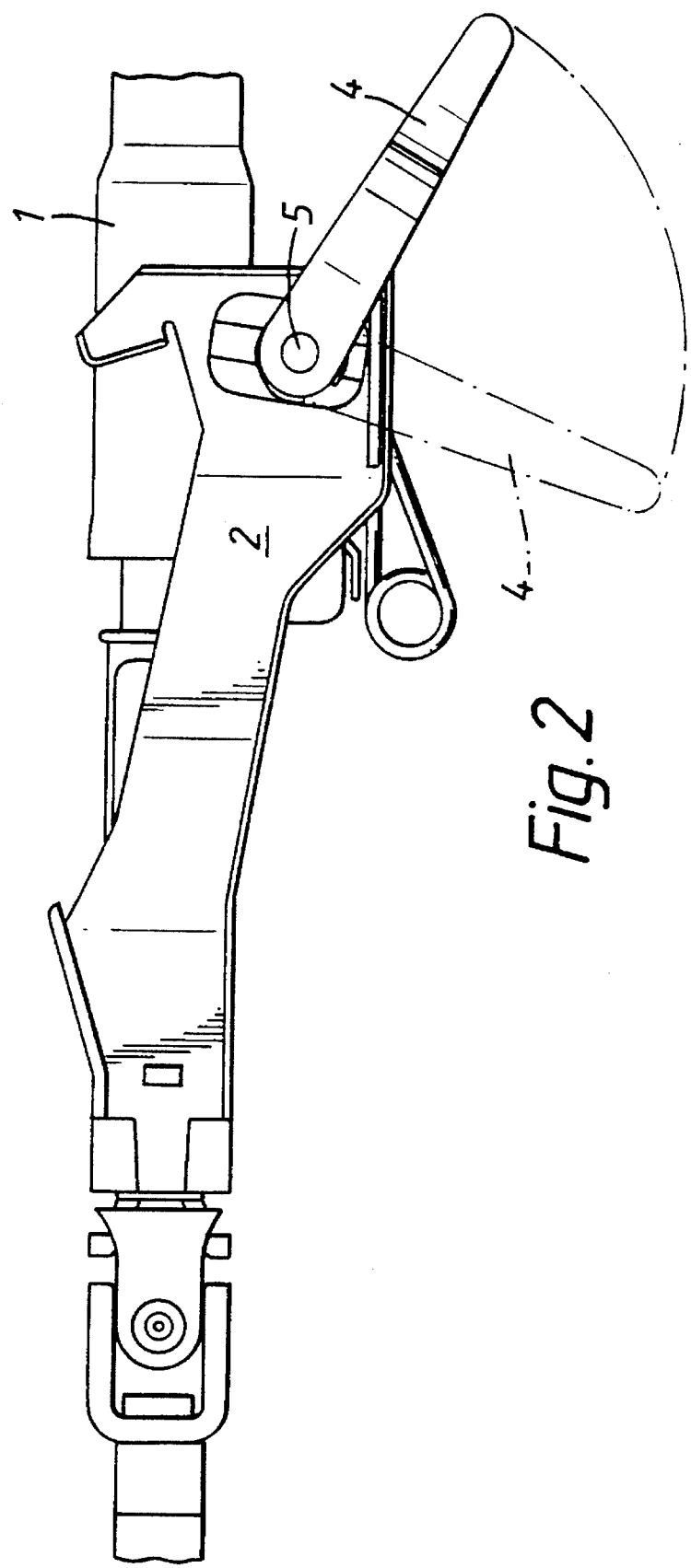
FIG. 2 is a diagrammatic side view of the clamping mechanism shown in FIG. 1.
Figure 4:
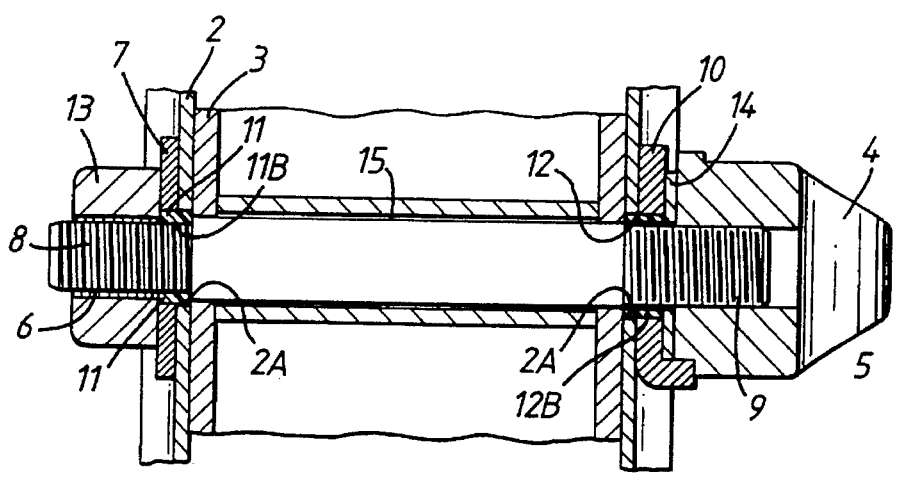
FIG. 4 is a diagrammatic horizontal sectional view of the clamping mechanism shown in FIG. 1.

Referring to the drawings, FIGS. 1, 2 and 4 illustrate part of a steering column clamping mechanism for an adjustable steering column 1 supported within bracketry 2 by a resilient channel-shaped bracket 3. Vertical adjustment of the steering column 1, for example, is provided by slots 2A in the bracketry 2.

An operating lock handle 4 is fitted on a shaft 5 to operate between clamped and unclamped conditions of the steering column 1.

In order to apply a pre-set but variable preload to the clamping mechanism, part of the shaft 5 is provided with opposed flats 6 to give it a non-circular section, so that it can be fitted within a shaft lock washer 7 having a central hole 7B in the form of a double-dee. The shaft 5 in the region of its flats 6 is threaded at 8 to receive a threaded member in the form of a tightening nut 13.

The opposite end of the shaft 5 is also threaded at 9 to receive the handle 4 and another lock washer 10 is provided to fit about the threaded end 9 of the shaft 5 inside the handle 4.

Figure 3:
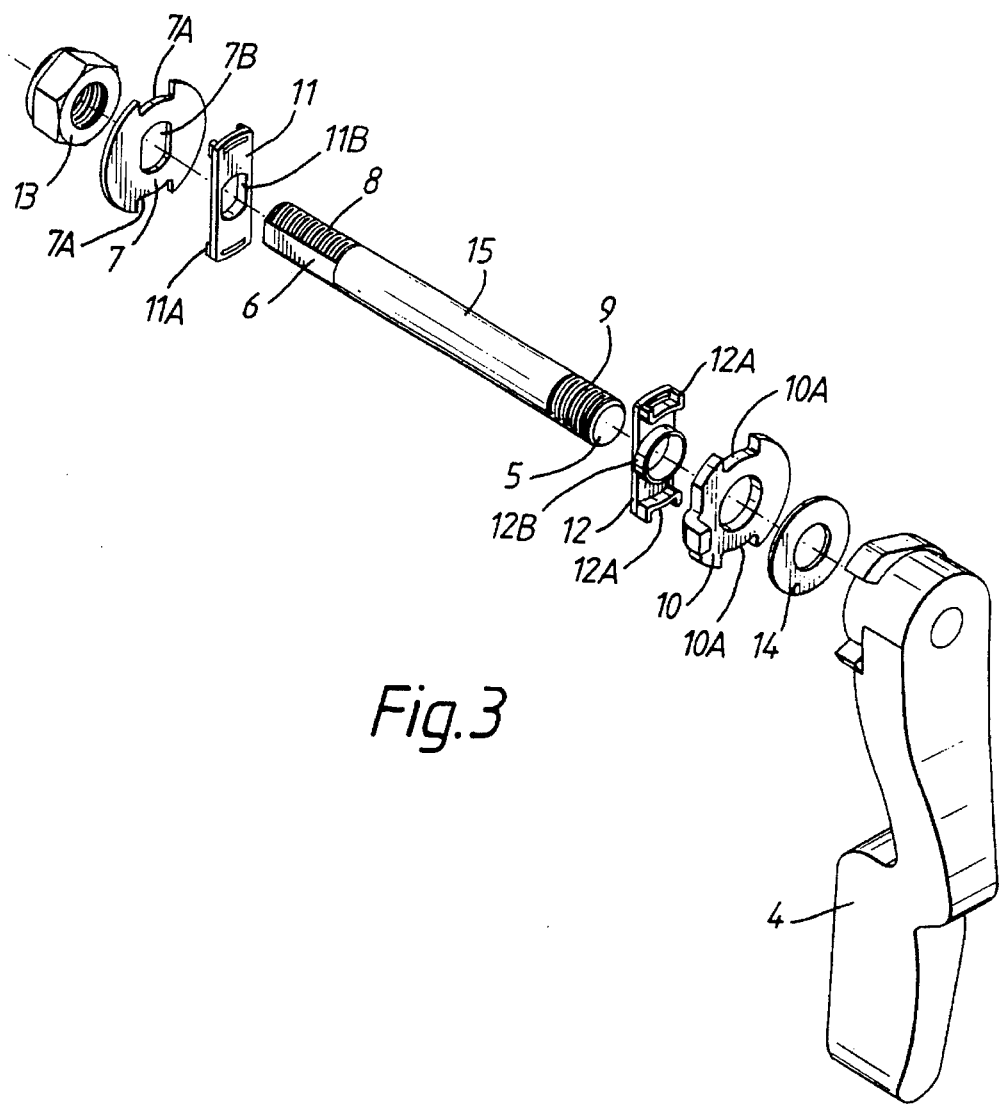
FIG. 3 is an exploded view of the clamping mechanism and showing the part of it intended to apply a pre-set preload to it.

In the form illustrated in FIG. 3, both the shaft lock washer 7 and the other washer 10 are provided with cut-away portions 7A, 10A, respectively, in which locate respective protrusions 11A, 12A of co-operating stop members 11, 12. The stop members 11, 12 themselves locate in respective slots in the bracketry 2. The protrusions 11A, 12A prevent the washers 7, 10 from rotating and, in the case of the washer 7 with its double-dee hole fitted on the flats of the shaft 5, means that the shaft 5 is itself prevented from rotation.

As a means of reducing noise and improving user feel at the extremes of adjustment, the stop members 11, 12 are of plastics material, so that the aforementioned vertical adjustment is provided with a plastics interface between the other components which are of metal, e.g. steel.

Further, the stop member 11 has a light interference fit on the shaft 5 to aid assembly by retaining the parts while the nut 13 is tightened.

The assembly sequence is to screw the handle 4 to the desired position on the screw threaded end 9 of the shaft 5. The washer 10 and stop-member 12 are fitted in the brackets 2 and 3. The subassembly of the lock shaft lock washer 7 and stop member 11 is fitted on the flats 6 and the nut 13 is tightened.

A plastics roller 15 is fitted to the shaft 5 in such a manner that the roller 5 is free to rotate. The roller runs in slots in the bracket 3 accommodating the shaft 5 to provide another plastics/metal interface, again to reduce noise.

A hardened steel washer 14 is fitted between the handle 4 and handle lock washer 10 to reduce wear between these components. It will be appreciated that the variable adjustment that can be given to the nut 13 provides the required preload of the clamping mechanism. As previously intimated, this means that the assembly can be carried out automatically.

Figure 1A:
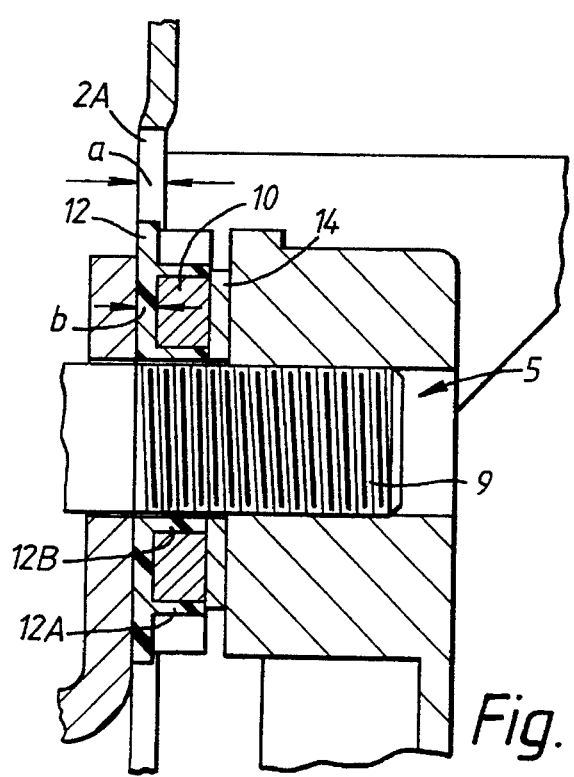
FIG. 1A is an enlarged view of a portion of the clamping mechanism shown in FIG. 1.

Stop members 11 and 12 have a flat rectangular shape with three protruding areas: protrusions 11A, 12A which locate in the cut-away portions 7A, 10A, respectively, of shaft lock washer 7 and washer 10; and bushing 11B and 12B, respectively, which locate in the central opening of shaft lock washer 7 and washer 10. As shown in FIG. 1A for stop member 12, the thickness of the flat rectangular portion of stop members 11 and 12 (shown as "b") is less than the thickness of the adjacent portions of bracketry 2 (shown as "a"). When the handle 4 is rotated to the clamped position, the portions of shaft lock washer 7 and washer 10 which extend laterally beyond the edges of stop members 11 and 12 engage the metal bracketry 2, providing a metal to metal clamping, as shown in FIG. 4. When the handle 4 and shaft 5 are in the unclamped position, the sides of plastic stop members 11 and 12 engage the sides of slots 2A, providing a plastic to metal interface when the steering column is being adjusted.

As shown in FIG. 3, handle 4 contains a flanged steel threaded insert that the shaft 5 screws into. The steel threaded insert bears upon steel thrust washer 14 which in turn bears upon lever lock washer 10. Referring to FIG. 1, the lever lock washer 10 bears upon the stop member 12. Between stop members 11 and 12 is the saddle bracket 3 which carries the adjustable steering column 1. Referring back to FIG. 3, the shaft lock washer 7 bears upon the stop member 11 with the clamping force achieved by adjusting nut 13, which bears upon the shaft lock washer 7.

Both stop members 11 and 12 are moulded in plastic. The lever lock stop member 12 locates in the lever lock washer 10 and the shaft lock stop member 11 locates in the shaft lock washer 7. These stop members 11, 12 prevent their respective mating parts 7, 10 from rotating by virtue of the fact that both stop members 11, 12 locate in the side bracket slots identified as 2A in FIG. 1. The stop members 11, 12 are free to slide vertically in slots 2A. Since both stop members 11, 12 are plastic, they provide a non-metallic interface between the shaft 5 and the inside edges of the bracket slots 2A, to reduce adjustment noise, but since stop members 11, 12 are thinner than the bracketry 2, the stop members 11, 12 do not prevent metal to metal contact between bracketry 2 and shaft lock washer 7 and lever lock washer 10.

Having described the invention, what is claimed is:

1. A steering column clamping mechanism for use with an adjustable steering column, the adjustable steering column including a support bracket having a thickness and a slot therethrough and a steering column bracket slidable relative to the support bracket, the mechanism having an unclamped condition allowing movement of the steering column and having a clamped condition preventing movement of the steering column, the clamping mechanism comprising:

at least one stop member being positioned in the support bracket slot, wherein the at least one stop member includes a flat rectangular portion, the flat rectangular portion being positioned within the support bracket slot and the thickness of the flat rectangular portion is less than the support bracket thickness; and an operating mechanism having a shaft extending therefrom, the shaft extending through the support bracket slot, the steering column bracket and the at least one stop member, the operating mechanism being moveable from the unclamped condition to the clamped condition, when the operating mechanism is in the unclamped condition, the at least one stop member slidably engages the support bracket slot, and when the operating mechanism is in the clamped condition, portions of the support bracket are clamped between the operating mechanism and the steering column bracket.

2. The steering column clamping mechanism according to claim 1 wherein the steering column bracket is metal, at least the portion of the operating mechanism which clamps the steering column bracket is metal and the stop member is plastic.

3. The steering column clamping mechanism according to claim 1 wherein the operating mechanism shaft is non-rotatable, the shaft being threaded at both ends, the operating mechanism being rotatable relative to the shaft.

4. The steering column clamping mechanism according to claim 3 wherein one end of operating mechanism shaft is threaded into the operating mechanism, the other end of the shaft being tensioned against the support bracket by a threaded member, the threaded member being tightened to provide a predetermined preload to the steering column clamping mechanism.

5. The steering column clamping mechanism according to claim 4 wherein the threaded member is a nut.

6. The steering column clamping mechanism according to claim 1 wherein the operating mechanism includes a lock handle.

7. The steering column clamping mechanism according to claim 1 wherein a portion of the operating mechanism shaft has a noncircular cross section; and wherein the operating mechanism has a shaft lock member engaging the shaft non-circular cross section portion, the shaft lock member engaging the support bracket to prevent rotation of the operating mechanism shaft.

8. The steering column clamping mechanism according to claim 7 wherein the shaft lock is comprised of two parts, a first part being a lock washer having at least one cut-away portion and a second part comprising at least one protrusion on the stop member which engages the at least one cut-away portion on the lock washer.

9. The steering column clamping mechanism according to claim 7 wherein said portions of the support bracket are clamped between shaft lock member and the steering column bracket.

10. The steering column clamping mechanism according to claim 7 wherein the shaft lock member, the steering column bracket and the support bracket are metal and the stop members are plastic.

11. The steering column clamping mechanism according to claim 1 wherein the stop member has a generally rectangular shape, the longer sides of the stop member slidably engaging the support bracket slot.

12. The steering column clamping mechanism according to claim 11 wherein the portions of the stop member adjacent the shorter sides of the stop member have protrusions extending parallel the operating mechanism shaft.

13. The steering column clamping mechanism according to claim 1, further comprising a plastic roller sleeve about the operating mechanism shaft.

14. A steering column clamping mechanism for use with an adjustable steering column, the adjustable steering column including a support bracket having a thickness and a slot therethrough and a steering column bracket slidable relative to the support bracket, the mechanism having an unclamped condition allowing movement of the steering column and having a clamped condition preventing movement of the steering column, the clamping mechanism comprising:

at least one stop member being positioned in the support bracket slot, the stop member having a thickness less than the support bracket thickness; and an operating mechanism having a shaft extending therefrom, the shaft extending through the support bracket slot, the steering column bracket and the at least one stop member, a portion of the shaft having a non-circular cross section, the operating mechanism being moveable from the unclamped condition to the clamped condition, when the operating mechanism is in the unclamped condition, the at least one stop member slidably engages the support bracket slot, and when the operating mechanism is in the clamped condition, portions of the support bracket are clamped between the operating mechanism and the steering column bracket, the operating mechanism having a shaft lock member engaging the shaft non-circular cross section portion, the shaft lock member engaging the support bracket to prevent rotation of the operating mechanism shaft, the shaft lock being comprised of two parts, a first part being a lock washer having at least one cut-away portion and a second part comprising at least one protrusion on the stop member which engages the at least one cut-away portion on the lock washer.

15. The steering column clamping mechanism according to claim 14 wherein the shaft lock member, the steering column bracket and the support bracket are metal and the stop members are plastic.

16. The steering column clamping mechanism according to claim 14, wherein the at least one stop member includes a flat rectangular portion, the flat rectangular portion being positioned within the support bracket slot and the thickness of the flat rectangular portion is less than the support bracket thickness.

* * * * *